United States Patent
Cakulev et al.

(10) Patent No.: US 11,601,989 B2
(45) Date of Patent: *Mar. 7, 2023

(54) SYSTEMS AND METHODS FOR MANAGING SMALL DATA OVER A NON-ACCESS STRATUM

(71) Applicant: Verizon Patent and Licensing Inc., Basking Ridge, NJ (US)

(72) Inventors: Violeta Cakulev, Millburn, NJ (US); Sudhakar Reddy Patil, Flower Mound, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 129 days.

This patent is subject to a terminal disclaimer.

(21) Appl. No.: 16/947,411

(22) Filed: Jul. 31, 2020

(65) Prior Publication Data

US 2020/0367298 A1    Nov. 19, 2020

Related U.S. Application Data

(63) Continuation of application No. 16/109,310, filed on Aug. 22, 2018, now Pat. No. 10,764,938.

(51) Int. Cl.
| | |
|---|---|
| *H04W 76/10* | (2018.01) |
| *H04W 8/08* | (2009.01) |
| *H04W 4/70* | (2018.01) |
| *H04W 92/24* | (2009.01) |

(52) U.S. Cl.
CPC .......... *H04W 76/10* (2018.02); *H04W 4/70* (2018.02); *H04W 8/08* (2013.01); *H04W 92/24* (2013.01)

(58) Field of Classification Search
None
See application file for complete search history.

(56) References Cited

U.S. PATENT DOCUMENTS

| | | | | |
|---|---|---|---|---|
| 8,831,014 | B2* | 9/2014 | Koodli | H04L 12/1485 |
| | | | | 370/401 |
| 9,531,812 | B2* | 12/2016 | Lim | H04L 47/2408 |
| 10,045,335 | B2* | 8/2018 | Chen | H04W 72/0413 |
| 10,069,791 | B2* | 9/2018 | Bhaskaran | H04W 64/00 |
| 10,764,938 | B2* | 9/2020 | Cakulev | H04W 76/10 |
| 10,944,831 | B2* | 3/2021 | Lim | H04L 47/2408 |
| 11,019,221 | B2* | 5/2021 | Mohamed | H04M 15/43 |
| 11,096,242 | B2* | 8/2021 | Atarius | H04W 76/11 |

(Continued)

*Primary Examiner* — Faiyazkhan Ghafoerkhan (57) ABSTRACT

A network device receives an attach request indicating that a user device is attempting a connection associated with a non-access stratum (NAS) and a particular interface, and generates a create session request that includes an indication that the connection for the user device is associated with the NAS and the particular interface. The network device provides, to a serving gateway (SGW) of the network, the create session request that includes the indication, and receives, from the SGW, a create session response that includes rules for handling the connection for the user device that is associated with the NAS and the particular interface, wherein the rules have been generated by a policy and charging rules function (PCRF) of the network. The network device provides, to the user device, an attach accept, that includes the rules, to permit the user device is to connect with the network and to utilize the rules.

20 Claims, 8 Drawing Sheets

(56) References Cited

U.S. PATENT DOCUMENTS

| | | | |
|---|---|---|---|
| 11,146,956 B2* | 10/2021 | Tomici | H04W 12/069 |
| 2011/0075675 A1* | 3/2011 | Koodli | H04M 15/41 |
| | | | 370/401 |
| 2015/0009988 A1* | 1/2015 | Lim | H04L 67/61 |
| | | | 370/389 |
| 2015/0117320 A1* | 4/2015 | Wang | H04W 64/00 |
| | | | 370/329 |
| 2016/0007385 A1* | 1/2016 | Sedlacek | H04W 76/10 |
| | | | 370/329 |
| 2016/0227590 A1* | 8/2016 | Huang | H04W 76/12 |
| 2016/0270097 A1* | 9/2016 | Wang | H04L 12/1407 |
| 2017/0048112 A1* | 2/2017 | Rönneke | H04L 41/12 |
| 2017/0064487 A1* | 3/2017 | Buckley | H04W 60/00 |
| 2017/0111456 A1* | 4/2017 | Lim | H04L 67/141 |
| 2017/0126618 A1* | 5/2017 | Bhaskaran | H04L 61/5014 |
| 2017/0171872 A1* | 6/2017 | Wang | H04W 64/00 |
| 2017/0231020 A1* | 8/2017 | Tomici | H04W 92/02 |
| 2017/0318606 A1* | 11/2017 | Lee | H04W 72/14 |
| 2017/0332308 A1* | 11/2017 | Tiwari | H04W 48/08 |
| 2017/0366679 A1* | 12/2017 | Mohamed | H04L 12/1467 |
| 2018/0007557 A1* | 1/2018 | Lee | H04L 63/08 |
| 2018/0176928 A1* | 6/2018 | Wang | H04L 41/0893 |
| 2019/0007984 A1* | 1/2019 | Kuroda | H04W 88/16 |
| 2019/0021130 A1* | 1/2019 | Kim | H04W 76/20 |
| 2019/0028933 A1* | 1/2019 | Kawasaki | H04W 36/0022 |
| 2019/0028992 A1* | 1/2019 | Kim | H04L 12/28 |
| 2019/0116483 A1* | 4/2019 | Ryu | H04W 76/32 |
| 2019/0116519 A1* | 4/2019 | Park | H04W 92/16 |
| 2019/0116531 A1* | 4/2019 | Ryu | H04W 36/0022 |
| 2019/0222998 A1* | 7/2019 | Kim | H04W 8/08 |
| 2019/0253870 A1* | 8/2019 | Rönneke | H04W 8/245 |
| 2019/0289571 A1* | 9/2019 | Park | H04W 60/00 |
| 2019/0335534 A1* | 10/2019 | Atari | H04M 15/66 |
| 2020/0037386 A1* | 1/2020 | Park | H04W 80/10 |
| 2020/0045760 A1* | 2/2020 | Adjakple | H04W 76/15 |
| 2020/0068626 A1* | 2/2020 | Cakulev | H04W 8/08 |
| 2020/0367298 A1* | 11/2020 | Cakulev | H04W 8/08 |
| 2021/0345450 A1* | 11/2021 | Atari | H04W 4/08 |
| 2021/0409948 A1* | 12/2021 | Tomici | H04L 63/0281 |

* cited by examiner

SYSTEMS AND METHODS FOR MANAGING SMALL DATA OVER A NON-ACCESS STRATUM

RELATED APPLICATION

This application is a continuation of U.S. patent application Ser. No. 16/109,310, entitled "SYSTEMS AND METHODS FOR MANAGING SMALL DATA OVER A NON-ACCESS STRATUM," filed Aug. 22, 2018, which is incorporated herein by reference.

BACKGROUND

The Third Generation Partnership Project (3GPP) defined a narrowband Internet of Things (NB-IoT) as a radio interface. NB-IoT is optimized for machine type (e.g., IoT device) traffic, and the NB-IoT radio access technology (RAT) is designed to reduce IoT device costs and to minimize battery consumption by IoT devices. The NB-IoT is also adapted to work in difficult radio conditions, which is frequent for some IoT devices. Although NB-IoT is an independent radio interface, it is tightly connected with the long-term evolution (LTE) standard. Non-Access Stratum (NAS) is a set of protocols in an Evolved Packet System (EPS). The NAS is used to convey non-radio signaling between a user device and a mobility management entity (MME) for a LTE/evolved universal terrestrial radio access network (E-UTRAN) access.

DETAILED DESCRIPTION OF PREFERRED EMBODIMENTS

The following detailed description of example implementations refers to the accompanying drawings. The same reference numbers in different drawings may identify the same or similar elements.

Data over NAS is a mechanism that provides efficient small data transfer by using an existing signaling plane for small data transfer. Data over NAS utilizes signaling radio bearers (SRBs) to carry data from a user device to a base station (e.g., an evolved Node B or eNB). The data is transported via the MME by encapsulating the data in NAS protocol data units (PDUs). This results in a reduced total number of control plane messages for sending a short data transaction, which, in turn, results in reduced signaling and conserves a battery life of the user device.

Current systems (e.g., 3GPP systems) and protocols fail to specify mechanisms to signal, to a policy and charging rules function (PCRF), that NAS is being used to transfer small data. Standards (e.g., 3GPP) define an information element (e.g., a serving public land mobile network (PLMN) rate control) which, if received by the PGW, can notify the PGW that a connection is for data over NAS. However, this information element is defined for purposes of the MME informing a packet data network gateway (PGW) and a service capability exposure function (SCEF) of any local serving PLMN rate control that the serving PLMN intends to enforce for NAS data PDUs. In other words, the information element is not defined for purposes of informing the PGW that data is over NAS and an S11-U interface. In addition, the information element is not mandatory since the MME needs to be configured to include serving PLMN rate control. As a result, the PCRF is unaware that small data is being transferred over NAS, and cannot apply different charging and quality of service (QoS) policies for the data transfer.

Some implementations described herein provide a network device that enables different charging and policy enforcement for small data over NAS and an S11-U interface. For example, the network device may receive an attach request from a base station of a network, wherein the attach request may indicate that a user device is attempting a connection associated with a NAS and a particular interface. The network device may generate, based on the attach request, a create session request that includes an indication that the connection for the user device is associated with the NAS and the particular interface, and may provide, to a serving gateway (SGW) of the network, the create session request that includes the indication. The network device may receive, from the SGW and as a response to the create session request, a create session response that includes rules for handling the connection for the user device that is associated with the NAS and the particular interface, wherein the rules have been generated by a policy and charging rules function (PCRF) of the network. The network device may provide, to the user device and based on the create session response, an attach accept that includes the rules, to permit the user device to connect with the network and to utilize the rules based on the create session response.

In this way, the network device may make the PCRF aware that small data is being transferred over NAS so that the PCRF may apply different charging and QoS policies for the small data transfer. This may result in a reduced quantity of control plane messages for sending the small data transfer, which, in turn, may result in reduced signaling and may conserve battery life of the user device.

Figure 1A:
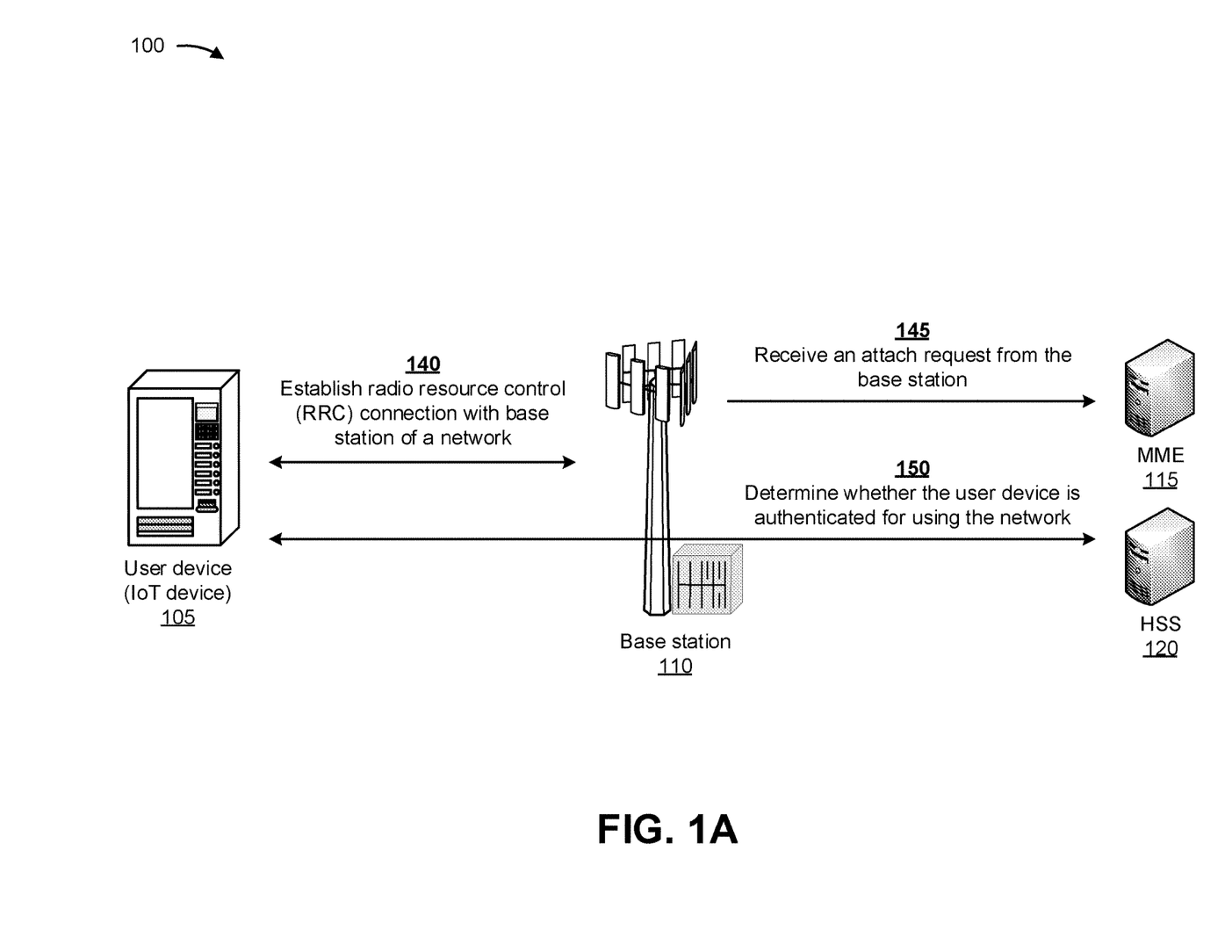
FIGS. 1A-1E are diagrams of an example implementation described herein.

FIGS. 1A-1E are diagrams of an example implementation 100 described herein. As shown in FIGS. 1A-1E, a user device 105 (e.g., an IoT device) may wish to access a network that includes a base station 110, a mobility management entity device (MME) 115, a home subscriber server (HSS) 120, a serving gateway (SGW) 125, a packet data network gateway (PGW) 130, and a policy and charging rules function (PCRF) 135. For example, as shown in FIG. 1A, and by reference number 140, user device 105 may establish a connection (e.g., a radio resource control (RRC) connection) with base station 110 of the network. In some implementations, user device 105 may be attempting the connection with the network to transfer data over a non-access stratum (NAS) and a particular interface (e.g., a S11-U interface). In some implementations, user device 105 may support cellular Internet of Things (CIoT) evolved packet system (EPS) optimization.

Base station 110 may generate an attach request based on user device 105 establishing the connection with base station 110, and may provide the attach request to MME 115. As further shown in FIG. 1A, and by reference number 145, MME 115 may receive the attach request from base station 110. In some implementations, the attach request may include information indicating that user device 105 supports CIoT EPS optimization.

As further shown in FIG. 1A, and by reference number 150, HSS 120 may interact with user device 105 (e.g., via base station 110 and MME 115) and may determine whether user device 105 is authenticated for using the network. If HSS 120 determines that user device 105 is not authenticated for using the network, HSS 120 may deny the attach request and user device 105 may be unable to establish the connection with the network. If HSS 120 determines that user device 105 is authenticated for using the network, HSS 120 may approve the attach request and the process of establishing the connection may continue.

Figure 1B:
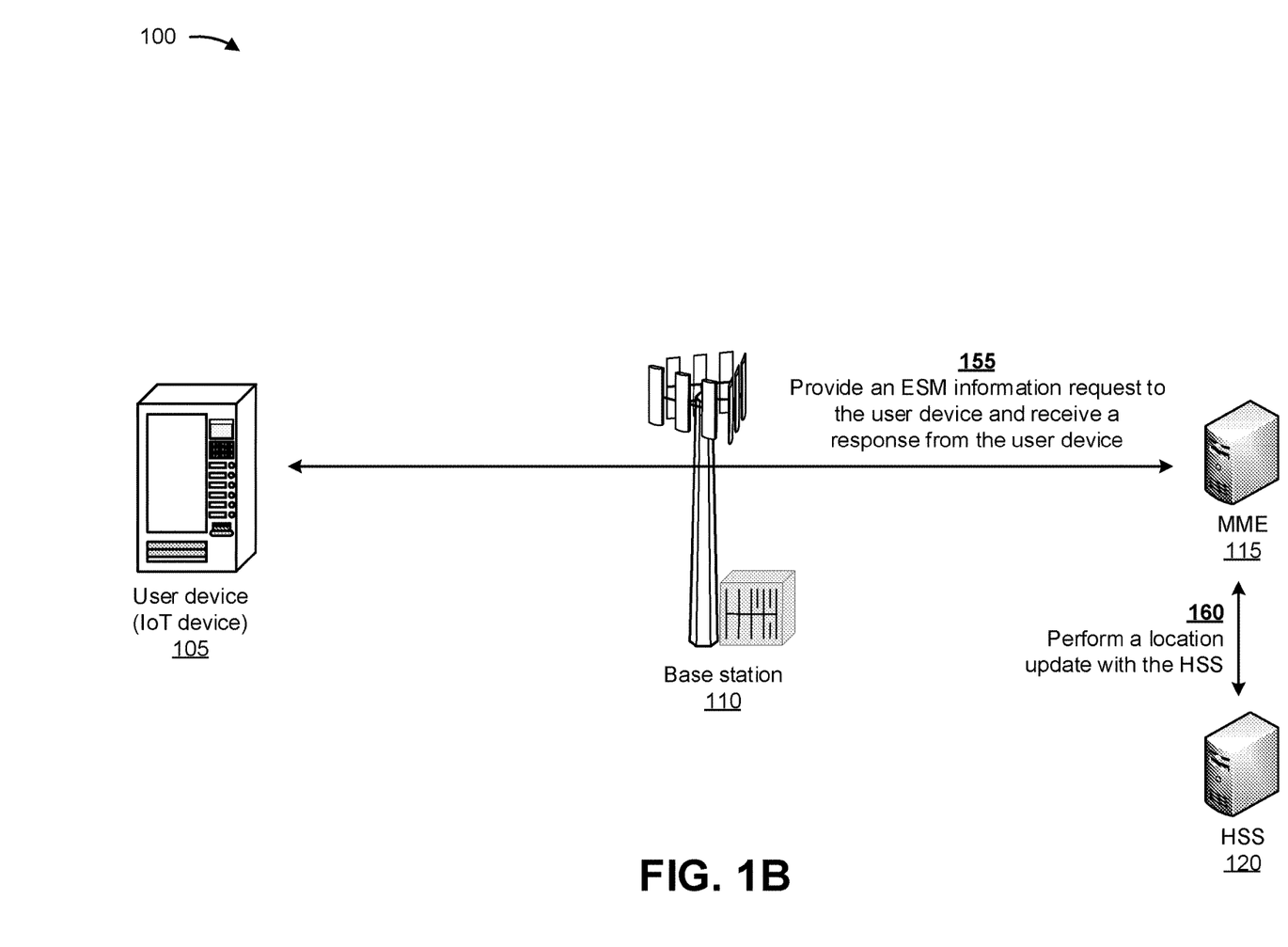

As shown in FIG. 1B, and by reference number 155, MME 115 may provide an information request (e.g., an evolved packet system (EPS) session management (ESM) information request) to user device 105 based on the attach request, and may receive a response from user device 105 based on the ESM information request. In some implementations, the response from user device 105 may include the ESM information requested in the ESM information request. In some implementations, the ESM information request procedure may be used by the network to retrieve ESM information (e.g., protocol configuration options, access point name (APN) control parameters, and/or the like) from user device 105 during the attach procedure if user device 105 indicates that user device 105 has ESM information that needs to be securely transmitted. The ESM information request procedure may provide privacy for the ESM information if ciphering is enabled in the network.

As further shown in FIG. 1B, and by reference number 160, MME 115 may perform a location update with HSS 120. In some implementations, a location update procedure may be utilized between MME 115 and HSS 120 to update location information, associated with MME 115, in HSS 120. The procedure may be invoked by MME 115 and may be used to inform HSS 120 about the identity of MME 115 currently serving user device 105, to update MME 115 with user subscription data, to provide HSS 120 with other user data (e.g., user device 105 service capability information), and/or the like.

Figure 1C:
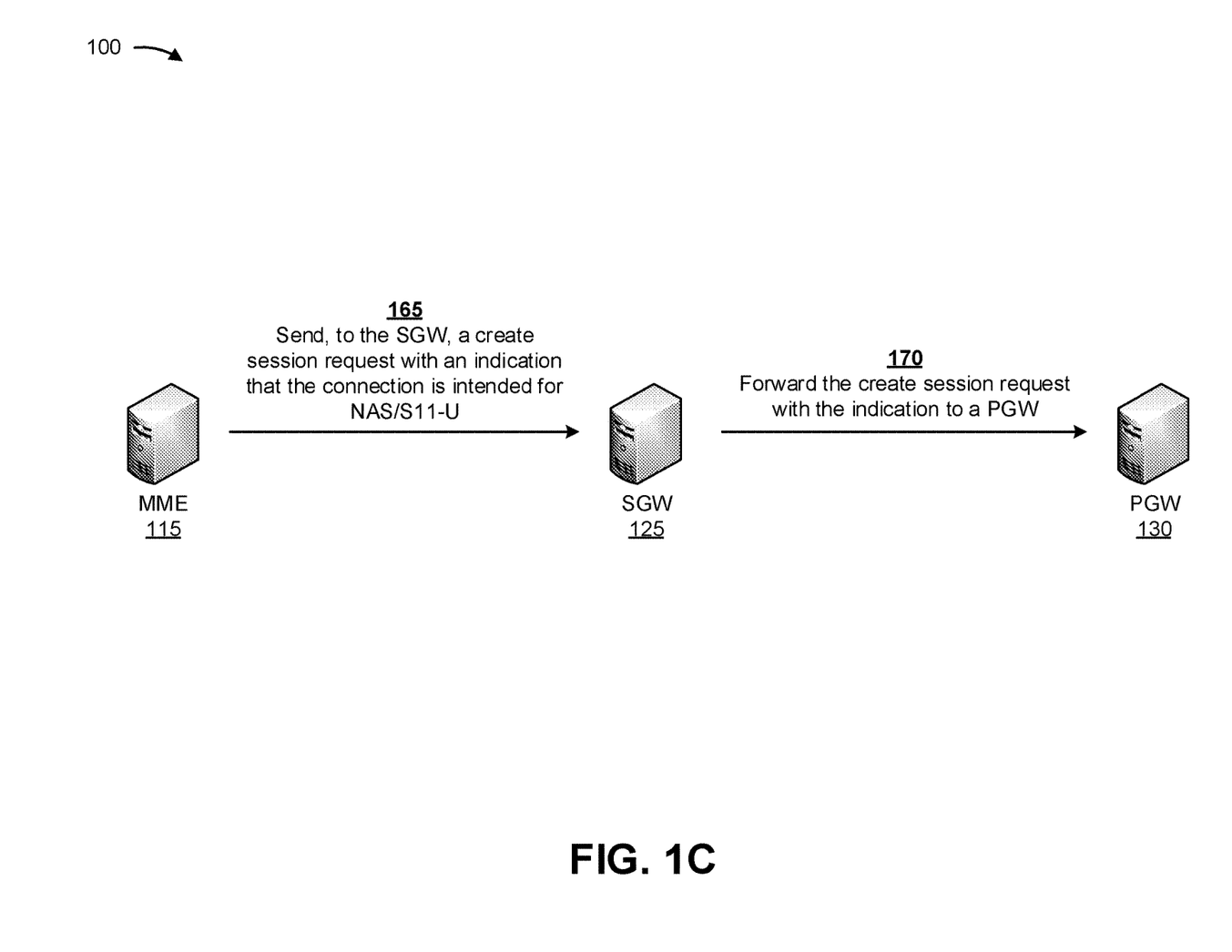

As shown in FIG. 1C, and by reference number 165, MME 115 may send, to SGW 125, a create session request with an indication that the connection is intended for the NAS and the particular interface (e.g., the S11-U interface). In some implementations, for control plane CIoT EPS optimization, the create session request may indicate that data from user device 105 is to utilize the S11-U interface tunneling of the NAS. In some implementations, MME 115 may provide, to SGW 125 and via the create session request, information indicating an address (e.g., an Internet protocol (IP) address) of the S11-U interface associated with MME 115, an address (e.g., an IP address) of MME 115 for downlink data forwarding by SGW 125, and/or the like. In some implementations, the indication that the connection is intended for the NAS and the particular interface may be provided by an attribute value pair (AVP) that indicates, to PCRF 135, that the connection is intended for the NAS and the particular interface.

As shown in FIG. 1C, and by reference number 170, SGW 125 may forward the create session request with the indication to PGW 130. In some implementations, SGW 125 may forward the create session request with the indication, when the create session request is received from MME 115. PGW 130 may receive the create session request with the indication from SGW 125, and may perform an IP-connectivity access network (IP-CAN) session establishment procedure with PCRF 135. An IP-CAN is an access network (e.g., a 3GPP access network) that provides IP connectivity.

Figure 1D:
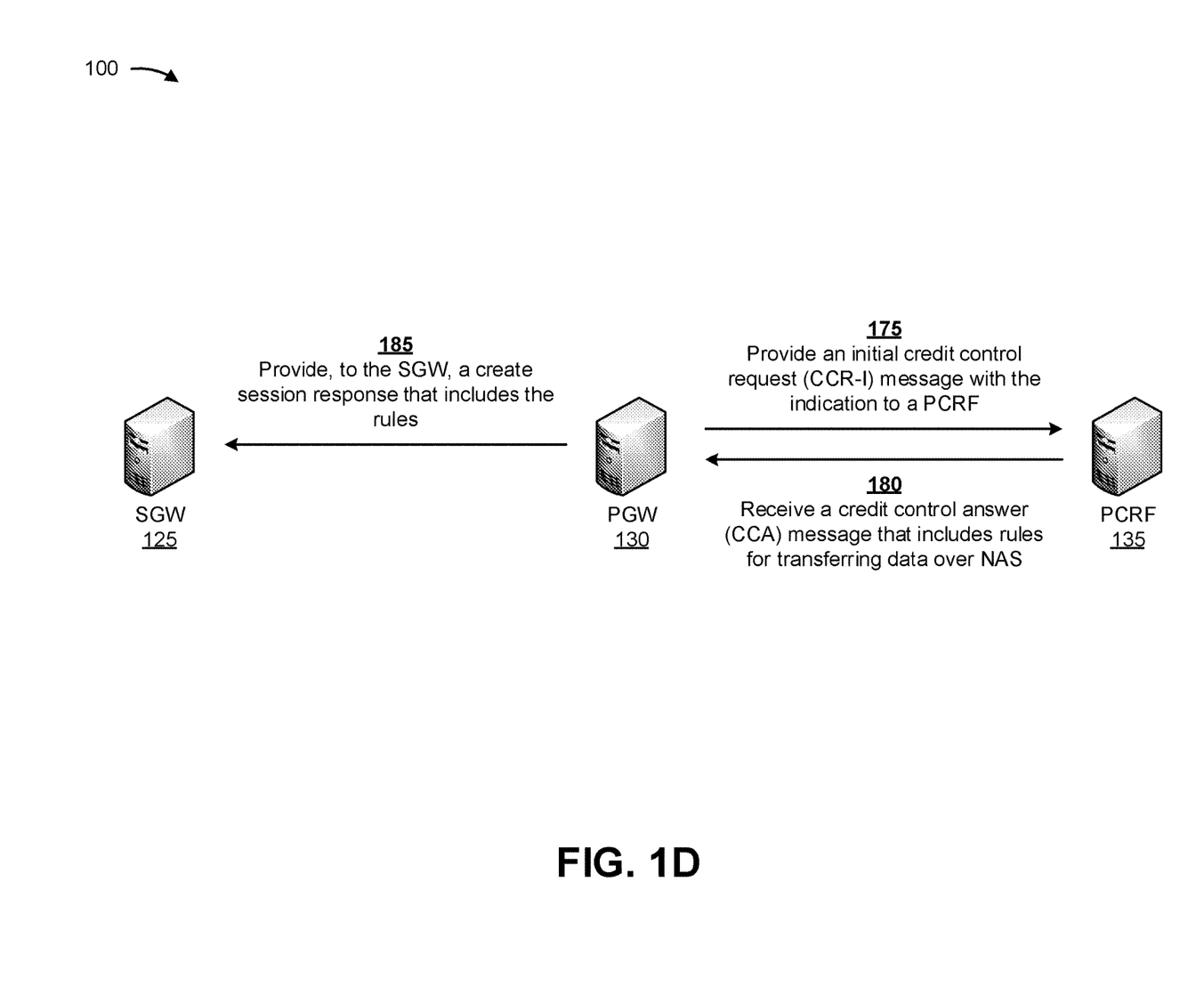

As shown FIG. 1D, and by reference number 175, in order to perform the IP-CAN session establishment procedure, PGW 130 may provide a request message (e.g., an initial credit control request (CCR-I) message) with the indication (e.g., that the connection is intended for the NAS and the particular interface) to PCRF 135. In some implementations, PGW 130 may provide the CCR-I message with the indication to PCRF 135 based on the create session request received from SGW 125. In some implementations, PCRF 135 may receive the CCR-I message with the indication, and may determine rules for transferring data over the NAS and via the S11-U interface (e.g., by user device 105) based on the CCR-I message and based on the indication. In some implementations, the rules may include rules associated with QoS to be applied for PGW 130 sessions intended for the NAS over the S11-U interface, rules associated with charging policies to be applied for PGW 130 sessions intended for the NAS over the S11-U interface, policy and charging control (PCC) rules, access point name (APN) control parameters, and/or the like.

As further shown in FIG. 1D, and by reference number 180, PCRF 135 may provide a credit control answer (CCA) message, that includes the rules for transferring data over the NAS and via the S11-U interface, to PGW 130, and PGW 130 may receive the CCA message and the rules. In some implementations, PCRF 135 may provide the CCA answer and the rules to PGW 130 based on the CCR-I message and based on determining the rules.

As further shown in FIG. 1D, and by reference number 185, PGW 130 may provide, to SGW 125, a create session response that includes the rules for transferring data over the NAS and via the S11-U interface. In some implementations, PGW 130 may generate the create session response that includes the rules based on the CCA message that includes the rules, and may provide the create session response with the rules to SGW 125 upon creation.

Figure 1E:
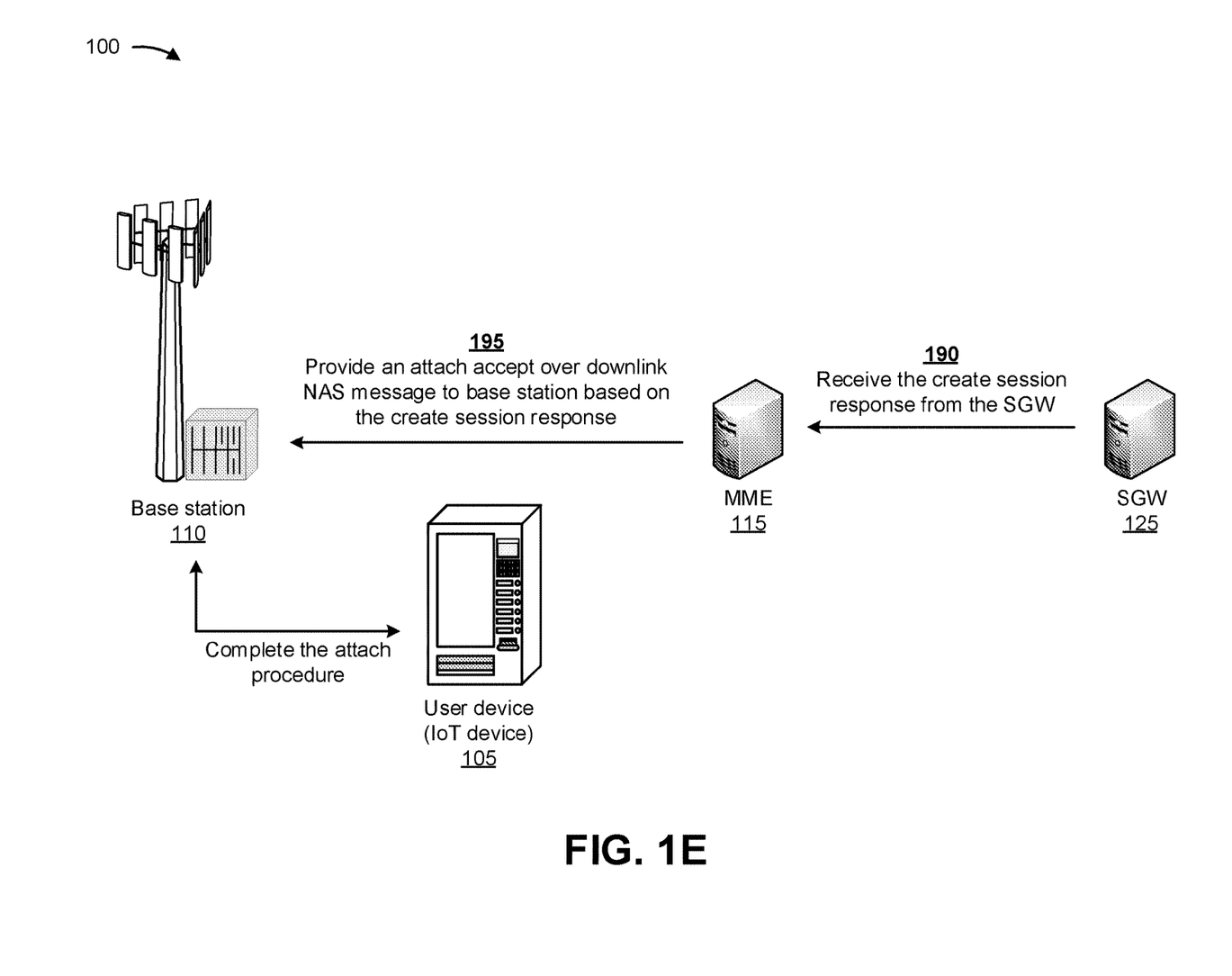

As shown in FIG. 1E, and by reference number 190, SGW 125 may provide the create session response with the rules to MME 115, and MME 115 may receive the create session response with the rules. In some implementations, MME 115 may generate an attach accept message based on the create session response with the rules. In such implementations, the attach accept message may include an attach accept over downlink NAS message. As further shown in FIG. 1E, and by reference number 195, MME 115 may provide the attach accept over downlink NAS message to base station 110. In some implementations, base station 110 may complete the attach procedure with user device 105 based on the attach accept over downlink NAS message. In this way, user device 105 may provide data over the NAS and the S11-U interface, and the network (e.g., MME 115) may apply differentiated QoS and charging policies to PGW 130 sessions intended for data over the NAS and the S11-U interface.

In some implementations, the indication that the connection is intended for the NAS and the particular interface may be provided via different interfaces of the network, such as a S5 interface, a Gx interface, and/or the like. In some implementations, the indication that the connection is intended for the NAS and the particular interface may be provided to PCRF 135 based on a packet analysis (e.g., a quantity of packets, a quantity of lost packets, and/or the like) performed by PGW 130.

In this way, several different stages of the process for enabling different charging and policy enforcement for small data over NAS and an S11-U interface are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that automatically enables different charging and policy enforcement for small data over NAS and an S11-U interface. Finally, automating the process for enabling different charging and policy enforcement for small data over NAS and an S11-U interface conserves computing resources (e.g., processing resources, memory resources, and/or the like) that would otherwise be wasted in attempting to apply different charging and policy enforcement for small data over NAS and an S11-U interface.

As indicated above, FIGS. 1A-1E are provided merely as examples. Other examples are possible and may differ from what was described with regard to FIGS. 1A-1E. The number and arrangement of devices and networks shown in FIGS. 1A-1E are provided as an example. In practice, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of FIGS. 1A-1E may perform one or more functions described as being performed by another set of devices of FIGS. 1A-1E.

Figure 2:
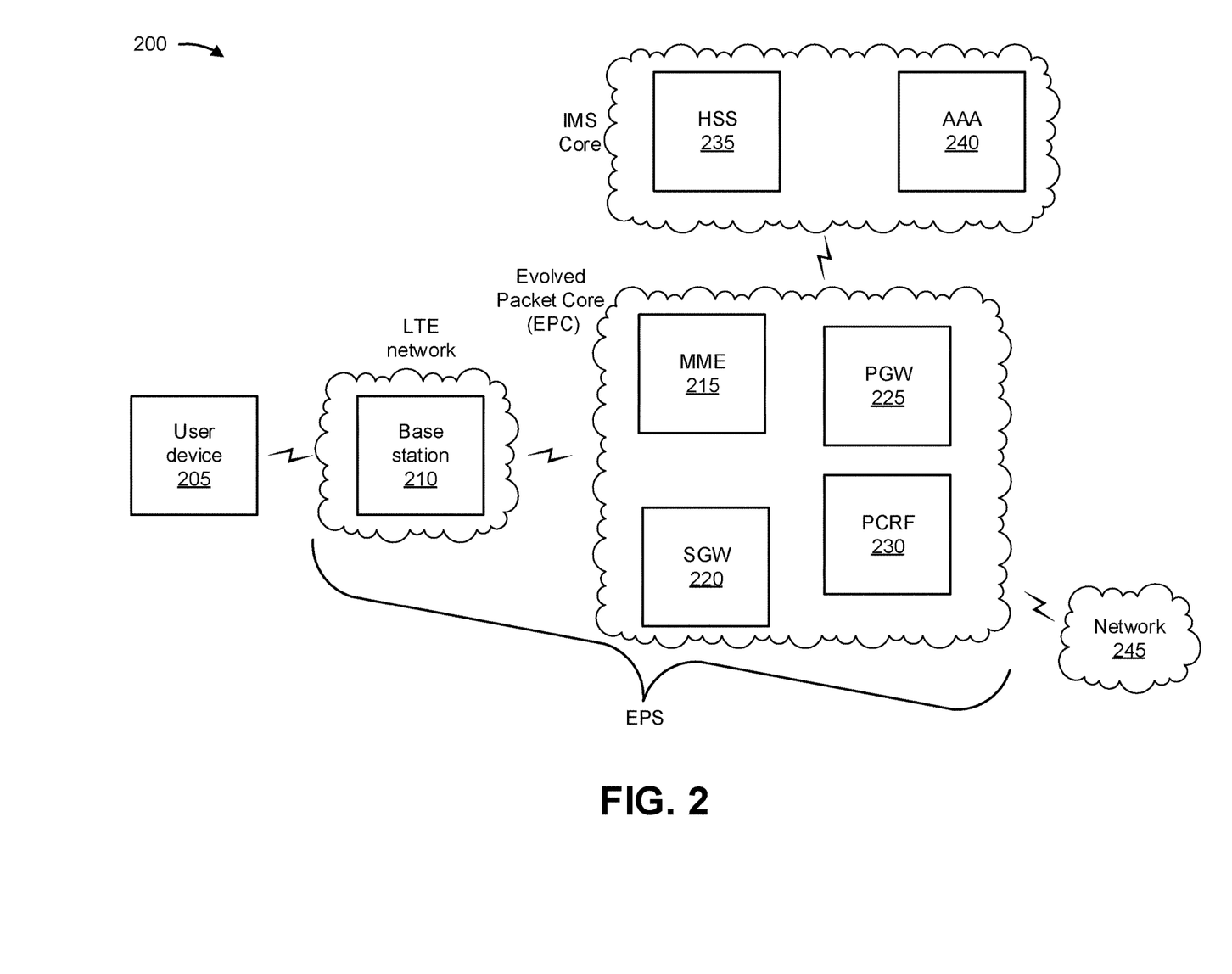
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a mobility management entity device (MME) 215, a serving gateway (SGW) 220, a packet data network gateway (PGW) 225, a policy and charging rules function (PCRF) 230, a home subscriber server (HSS) 235, an authentication, authorization, and accounting server (AAA) 240; and a network 245. Devices of environment 200 may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a third generation (3G) network, a fifth generation (5G) network, and/or the like.

Environment 200 may include an evolved packet system (EPS) that includes an LTE network and/or an evolved packet core (EPC) that operate based on a third-generation partnership project (3GPP) wireless communication standard. The LTE network may include a radio access network (RAN) that includes one or more base stations 210 that take the form of evolved Node Bs (eNBs) via which user device 205 communicates with the EPC. The EPC may include MME 215, SGW 220, and/or PGW 225 to enable user device 205 to communicate with network 245 and/or an Internet protocol (IP) multimedia subsystem (IMS) core. The IMS core may include HSS 235 and/or AAA 240, and may manage device registration and authentication, session initiation, and/or the like, associated with user devices 205. HSS 235 and/or AAA 240 may reside in the EPC and/or the IMS core.

User device 205 includes one or more devices capable of communicating with other user devices 205, base station 210, and/or a network (e.g., network 245). For example, user device 205 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. User device 205 may send traffic to and/or receive traffic from another user device 205 and/or network 245 (e.g., via base station 210, SGW 220, and/or PGW 225).

Base station 210 includes one or more devices capable of transferring traffic, such as audio, video, text, and/or other traffic, destined for and/or received from user device 205. In some implementations, base station 210 may include an eNB associated with the LTE network that receives traffic from and/or sends traffic to network 245 via SGW 220 and/or PGW 225. Additionally, or alternatively, one or more base stations 210 may be associated with a RAN that is not associated with the LTE network. Base station 210 may send traffic to and/or receive traffic from user device 205 via an air interface. In some implementations, base station 210 may include a small cell base station, such as a base station of a microcell, a picocell, a femtocell, and/or the like. MME 215 includes one or more devices, such as one or more server devices, capable of managing authentication, activation, deactivation, and/or mobility functions associated with user device 205. In some implementations, MME 215 may perform operations relating to authentication of user device 205. Additionally, or alternatively, MME 215 may facilitate the selection of a particular SGW 220 and/or a particular PGW 225 to provide traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 245 (e.g., via PGW 225) and/or other network devices associated with the EPC and/or the IMS core. SGW 220 may receive traffic from network 245 and/or other network devices, and may send the received traffic to user device 205 via base station 210. Additionally, or alternatively, SGW 220 may perform operations associated with handing off user device 205 to and/or from an LTE network.

PGW 225 includes one or more devices capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 245. Additionally, or alternatively, PGW 225 may receive traffic from network 245, and may send the traffic to user device 205 via SGW 220 and base station 210. PGW 225 may record data usage information (e.g., byte usage), and may provide the data usage information to AAA 240.

PCRF 230 includes one or more devices, such as one or more server devices, capable of providing policy control decision and flow-based charging control functionalities. For example, PCRF 230 may provide network control regarding service data flow detection, gating, quality of service (QoS) and flow-based charging, and/or the like. In some implementations, PCRF 230 may determine how a certain service data flow is to be treated, and may ensure that user plane traffic mapping and treatment is in accordance with a user subscription profile.

HSS 235 includes one or more devices, such as one or more server devices, capable of managing (e.g., receiving, generating, storing, processing, providing, and/or the like) information associated with user device 205. For example, HSS 235 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 235 may provide this information to one or more other devices of environment 200 to support the operations performed by those devices.

AAA 240 includes one or more devices, such as one or more server devices, that perform authentication, authorization, and/or accounting operations for communication sessions associated with user device 205. For example, AAA 240 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, etc.), may track resources consumed by user device 205 (e.g., a quantity of voice minutes consumed, a quantity of data consumed, etc.), and/or may perform similar operations.

Network 245 includes one or more wired and/or wireless networks. For example, network 245 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
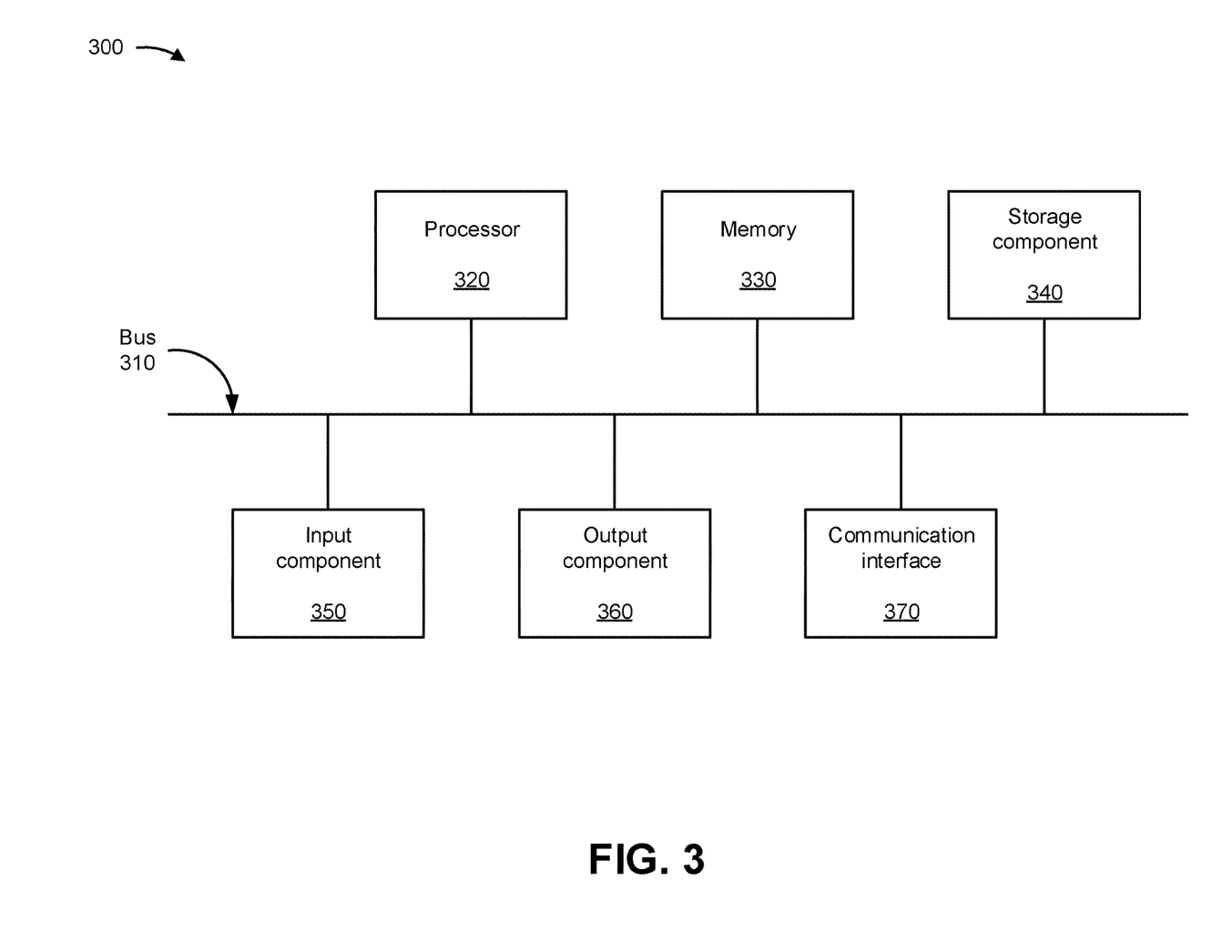
FIG. 3 is a diagram of example components of one or more devices of FIG. 2.

FIG. 3 is a diagram of example components of a device 300. Device 300 may correspond to user device 205, base station 210, MME 215, SGW 220, PGW 225, PCRF 230, HSS 235, and/or AAA 240. In some implementations, user device 205, base station 210, MME 215, SGW 220, PGW 225, PCRF 230, HSS 235, and/or AAA 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
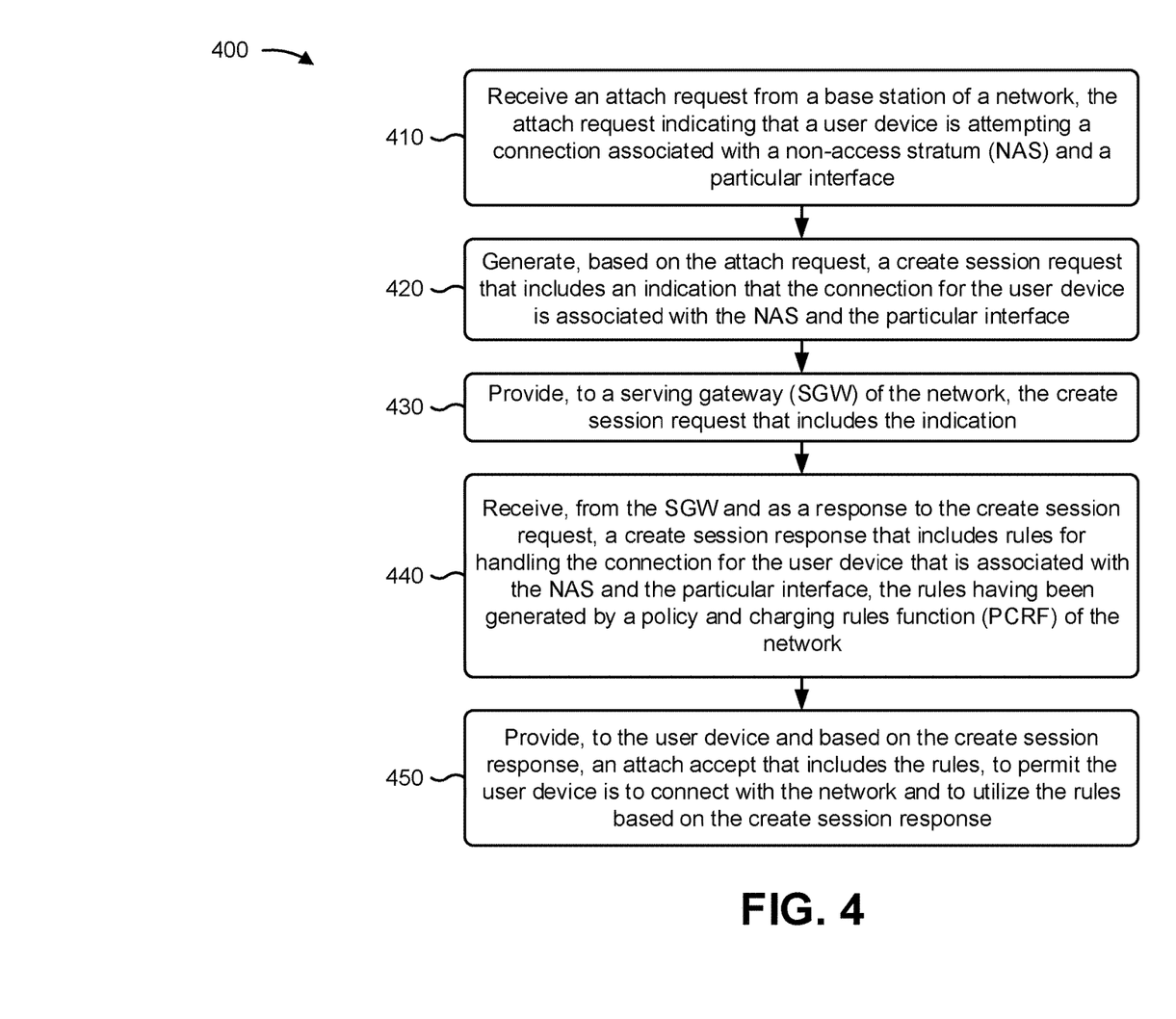
FIG. 4 is a flow chart of an example process for enabling different charging and policy enforcement for small data over NAS and an S11-U interface.

FIG. 4 is a flow chart of an example process 400 for enabling different charging and policy enforcement for small data over NAS and an S11-U interface. In some implementations, one or more process blocks of FIG. 4 may be performed by a network device, such as a MME (e.g., MME 215). In some implementations, one or more process blocks of FIG. 4 may be performed by another device or a group of devices separate from or including the network device, such as a base station (e.g., base station 210), a SGW (e.g., SGW 220), a PGW (e.g., PGW 225), and/or a HSS (e.g., HSS 235).

As shown in FIG. 4, process 400 may include receiving an attach request from a base station of a network, the attach request indicating that a user device is attempting a connection associated with a non-access stratum (NAS) and a particular interface (block 410). For example, the network device (e.g., using processor 320, communication interface 370, and/or the like) may receive an attach request from a base station of a network, as described above in connection with FIGS. 1A-2. In some implementations, the attach request may indicate that a user device (e.g., an IoT device) is attempting a connection associated with a non-access stratum (NAS) and a particular interface (e.g., a tunneling interface, such as a S11-U interface). In some implementations, the attach request may include information indicating that the user device supports cellular Internet of Things (CIoT) evolved packet system (EPS) optimization.

As further shown in FIG. 4, process 400 may include generating, based on the attach request, a create session request that includes an indication that the connection for the user device is associated with the NAS and the particular interface (block 420). For example, the network device (e.g., using processor 320, memory 330, communication interface 370, and/or the like) may generate, based on the attach request, a create session request that includes an indication that the connection for the user device is associated with the NAS and the particular interface, as described above in connection with FIGS. 1A-2. In some implementations, the indication may include an attribute value pair that indicates the connection for the user device is intended for the NAS and the particular interface.

In some implementations, the network device may provide an evolved packet system (EPS) session management (ESM) information request to the user device based on the attach request, and may receive ESM information from the user device based the ESM information request. In some implementations, when generating the create session request, the network device may generate, based on the ESM information, the create session request that includes the indication that the connection for the user device is intended for the NAS and the particular interface. In some implementations, the network device may perform a location update, associated with the network device, with a home subscriber server (HSS) of the network based on the ESM information.

As further shown in FIG. 4, process 400 may include providing, to a serving gateway (SGW) of the network, the create session request that includes the indication (block 430). For example, the network device (e.g., using processor 320, storage component 340, communication interface 370, and/or the like) may provide, to a serving gateway (SGW) of the network, the create session request that includes the indication, as described above in connection with FIGS. 1A-2.

As further shown in FIG. 4, process 400 may include receiving, from the SGW and as a response to the create session request, a create session response that includes rules for handling the connection for the user device that is associated with the NAS and the particular interface, the rules having been generated by a policy and charging rules function (PCRF) of the network (block 440). For example, the network device (e.g., using processor 320, communication interface 370, and/or the like) may receive, from the SGW and as a response to the create session request, a create session response that includes rules for handling the connection for the user device that is associated with the NAS and the particular interface, as described above in connection with FIGS. 1A-2. In some implementations, the rules may have been generated by a policy and charging rules function (PCRF) of the network. In some implementations, the rules may include access point name (APN) control parameters.

As further shown in FIG. 4, process 400 may include providing, to the user device and based on the create session response, an attach accept that includes the rules, to permit the user device is to connect with the network and to utilize the rules based on the create session response (block 450). For example, the network device (e.g., using processor 320, storage component 340, communication interface 370, and/or the like) may provide, to the user device and based on the create session response, an attach accept that includes the rules, to permit the user device to connect with the network and to utilize the rules based on the create session response, as described above in connection with FIGS. 1A-2. In some implementations, the network device may provide the attach accept that includes the rules to the base station to permit the base station to cause the user device to connect with the network and to utilize the rules based on the attach accept.

Process 400 may include additional implementations, such as any single implementation or any combination of implementations described below and/or described with regard to any other process described herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a network device that enables different charging and policy enforcement for small data over NAS and an S11-U interface. For example, the network device may receive an attach request from a base station of a network, wherein the attach request may indicate that a user device is attempting a connection associated with a non-access stratum (NAS) and a particular interface. The network device may generate, based on the attach request, a create session request that includes an indication that the connection for the user device is associated with the NAS and the particular interface, and may provide, to a serving gateway (SGW) of the network, the create session request that includes the indication. The network device may receive, from the SGW and as a response to the create session request, a create session response that includes rules for handling the connection for the user device that is associated with the NAS and the particular interface, wherein the rules have been generated by a policy and charging rules function (PCRF) of the network. The network device may provide, to the user device and based on the create session response, an attach accept that includes the rules, to permit the user device is to connect with the network and to utilize the rules based on the create session response.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
one or more processors configured to:
receive an attach request from a first device of a network,
the attach request indicating that a user device is attempting a connection associated with a non-access stratum (NAS);
generate, based on the attach request, a create session request that includes an indication that the connection for the user device is associated with the NAS, wherein the indication includes an attribute value pair that indicates the connection for the user device is intended for the NAS and a particular interface;
provide, to a second device of the network, the create session request that includes the indication;
receive, from the second device and as a response to the create session request, a create session response that includes rules for transferring data over the NAS and via the particular interface by the user device; and
provide, to the user device and based on the create session response, an attach accept, that includes the rules, to permit the user device to connect with the network and to utilize the rules.

2. The network device of claim 1, wherein the rules are generated by a third device of the network, and
wherein the user device is to connect with the network and to utilize the rules based on the create session response.

3. The network device of claim 1, wherein the one or more processors are further to:
provide an evolved packet system (EPS) session management (ESM) information request to the user device based on the attach request;
receive ESM information from the user device based on the ESM information request; and
generate the create session request based on the ESM information.

4. The network device of claim 1, wherein:
the network device is a mobility management entity (MME) of the network, and
the user device is an Internet of Things (IoT) device.

5. The network device of claim 1, wherein the rules are generated by a policy and charging rules function (PCRF) of the network based on the attribute value pair.

6. The network device of claim 1, wherein the one or more processors are further to:
provide the attach accept to the first device to permit the first device to cause the user device to connect with the network and to utilize the rules.

7. The network device of claim 1, wherein the rules include access point name (APN) control parameters.

8. A non-transitory computer-readable medium storing instructions, the instructions comprising: one or more instructions that, when executed by one or more processors of a network device, cause the one or more processors to: receive an attach request associated with a network, the attach request indicating that a user device is attempting a connection associated with a non-access stratum (NAS) and a particular interface, the particular interface being associated with tunneling of data associated with the NAS from the user device; generate, based on the attach request, a create session request that includes an indication that the connection for the user device is associated with the NAS and the particular interface; provide, to a serving gateway (SGW) of the network, the create session request that includes the indication; receive, from the SGW and as a response to the create session request, a create session response that includes rules for transferring the data over the NAS and via the particular interface by the user device; and provide, to the user device and based on the create session response, an attach accept, that includes the rules, to permit the user device to connect with the network and to utilize the rules.

9. The non-transitory computer-readable medium of claim 8, wherein the particular interface is provided via different interfaces of the network.

10. The non-transitory computer-readable medium of claim 9, wherein the different interfaces including at least one of:
a S5 interface, or
a Gx interface.

11. The non-transitory computer-readable medium of claim 8, wherein the instructions further comprise:
one or more instructions that, when executed by the one or more processors, cause the one or more processors to:
provide the attach accept that includes the rules to a base station to permit the base station to cause the user device to connect with the network and to utilize the rules based on the attach accept.

12. The non-transitory computer-readable medium of claim 8, wherein the user device is an Internet of Things (IoT) device.

13. The non-transitory computer-readable medium of claim 8, wherein the indication includes an attribute value pair that indicates the connection for the user device is associated with the NAS and the particular interface.

14. The non-transitory computer-readable medium of claim 8, wherein the attach request includes information indicating that the user device supports cellular Internet of Things (CIoT) evolved packet system (EPS) optimization.

15. A method, comprising:
receiving, by a network device, an attach request from a first device of a network,
the attach request indicating that a user device is attempting a connection associated with a non-access stratum (NAS);
generating, by the network device and based on the attach request, a create session request that includes an indication that the connection for the user device is associated with the NAS and a particular interface;
providing, by the network device and to a second device of the network, the create session request that includes the indication;
receiving, by the network device, from the second device, and as a response to the create session request, a create session response that includes rules for transferring data over the NAS and via the particular interface by the user device; and
providing, by the network device, to the user device, and based on the create session response, an attach accept that includes the rules.

16. The method of claim 15, wherein the attach request indicates that the user device is attempting the connection associated with the NAS with the particular interface,
wherein the particular interface is a tunneling interface.

17. The method of claim 15, wherein the user device is to connect with the network and to utilize the rules based on the create session response.

18. The method of claim 15, further comprising:
providing an evolved packet system (EPS) session management (ESM) information request to the user device based on the attach request;
receiving ESM information from the user device based on the ESM information request; and
generating the create session request based on the ESM information.

19. The method of claim 15, further comprising:
providing the attach accept that includes the rules to the first device of the network to permit the first device to cause the user device to connect with the network and to utilize the rules based on the attach accept.

20. The method of claim 15, wherein the indication includes an attribute value pair that indicates the connection for the user device is associated with the NAS.

* * * * *